F. W. MILLER.
SEPARATOR.
APPLICATION FILED OCT. 7, 1918.
1,396,939.
Patented Nov. 15, 1921.
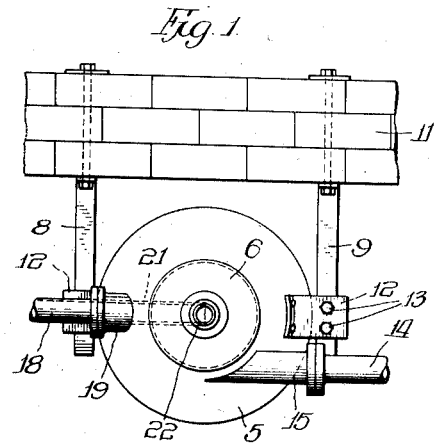
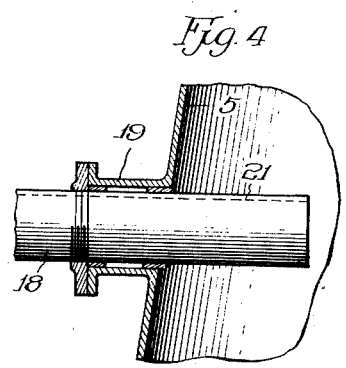
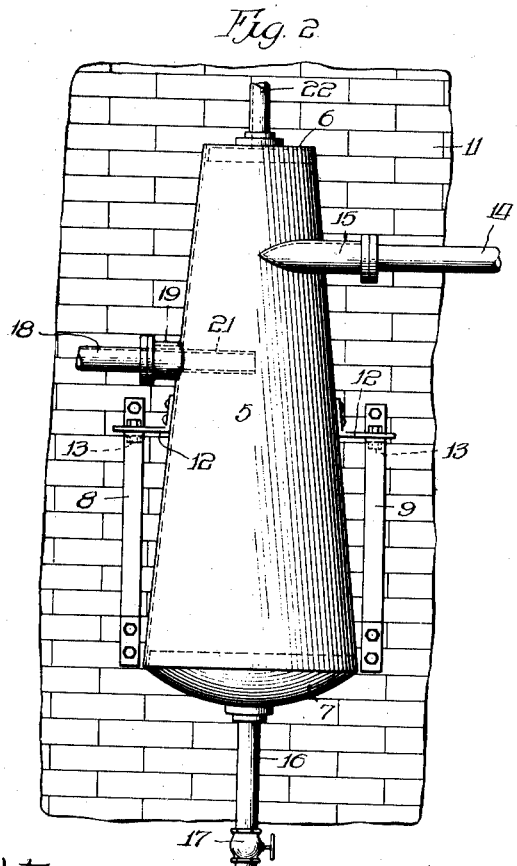
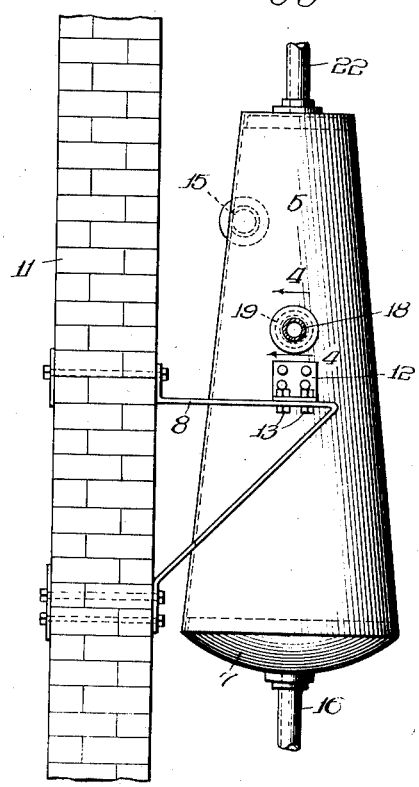
Witness:
Inventor:
Frank W. Miller

UNITED STATES PATENT OFFICE.

FRANK W. MILLER, OF CHICAGO, ILLINOIS, ASSIGNOR OF ONE-HALF TO CLARENCE D. BAUERS, OF CHICAGO, ILLINOIS.

SEPARATOR.

1,396,939. Specification of Letters Patent. Patented Nov. 15, 1921.

Application filed October 7, 1918. Serial No. 257,120.

*To all whom it may concern:*

Be it known that I, FRANK W. MILLER, a citizen of the United States, residing at Chicago, in the county of Cook and State of Illinois, have invented certain new and useful Improvements in Separators, of which the following is a specification.

This invention relates in general to separators for separating liquid and solids and the particular form of the invention herein shown, is designed to separate steam, water, and solid matter from each other and to distribute these constituents separately to individual containers or other preferred apparatus.

The particular form of my invention herein illustrated, is adapted for use in boiler washing and filling systems. In systems of this character, the steam and water from a locomotive boiler are blown-off, under pressure through a pipe line, commonly known as a blow-off line, and after the scale, sludge and other impurities in solid form, carried with the steam and water, have been separated out, the blow-off water is collected in a tank as washout water to be used in washing out locomotive boilers, while the blow-off steam is separated from the water and delivered to a tank containing clean, fresh water, which water is heated by this blow-off steam to be used for refilling the boilers. Other types of systems are also in use but that just described is most common and my present invention has for its primary object, the provision of a separator which will economically, rapidly, and efficiently separate in one operation the blow-off steam, the blow-off water and the solid matter discharged from the boiler, so that each of these three constituents may be utilized individually and independently for any desired purpose.

Another object of my invention is to provide a separator for this purpose, which will be simple in construction, cheap to manufacture, efficient in operation, one which will not get out of order or become clogged up in operation and which will be strong and durable in service.

Other objects and many of the inherent advantages of this invention will be readily appreciated by those skilled in the art, as the invention becomes better understood by referring to the following description, when considered in connection with the accompanying drawings.

Figure 1 is a plan view of a separator embodying my invention.

Fig. 2 is a side elevation thereof.

Fig. 3 is an elevation looking toward the right at Fig. 2; and

Fig. 4 is a fragmentary sectional view taken on the line 4—4 of Fig. 3.

By reference to the drawings, it will be observed that the separator comprises primarily a cylindrical receptacle 5, preferably of frusto-conical shape, provided with a top 6 and a bottom 7 of a larger diameter than the top, and preferably of concave shape, to facilitate the discharge of sludge as will readily be apparent.

This receptacle may be mounted in any suitable manner and I have shown, for purpose of illustration, one practical and preferred mounting, consisting of a pair of brackets 8 and 9 secured by means of bolts or other preferred fastening means to the wall 11, the receptacle being provided at opposite sides with ears of bracket members 12 adapted to rest upon the brackets 8 and 9, to which they are rigidly secured by bolts 13.

The blow-off steam and water and the solid matter carried thereby, are delivered through the blow-off line 14 to the separator receptacle, through a nozzle 15, entering the receptacle at a point approximately one-quarter of the height of the receptacle, below the top thereof, the nozzle being disposed tangentially to the wall of the receptacle as shown in Figs. 1 and 3, so that the blow-off products are delivered tangentially into the receptacle and continue in a whirling circular movement toward the bottom of the receptacle. This whirling, circular movement of the blow-off products causes the heavier solid matter to be thrown by centrifugal action against the walls of the receptacle and as the products move downwardly, under the influence of gravity, the increase in the diameter of the receptacle causes the sludge and solid particles to quickly settle in a quiescent condition in the bottom of the receptacle from which the solid matter may be discharged at suitable intervals through a sludge pipe 16 to the sewer. This pipe is equipped with a valve which is shown in the present instance as a hand valve 17, but which if preferred, may be an automatically controlled valve which may be opened at predetermined intervals to permit the discharge of the accumulated sludge and other solid matter from the separator.

The water is conducted from the separator to a tank or other preferred point of use by a pipe 18, which enters the receptacle a little above the middle thereof. From Fig. 4 it will be observed that the receptacle is equipped with a laterally projecting nozzle or fitting 19, to which the pipe 18 is rigidly and tightly secured and projects inwardly into the receptacle, substantially to the longitudinal axis thereof. It will be manifest that the inner end of this extension 21, through which the water is delivered from the receptacle, is disposed where the water is cleanest since the heavier solid particles are forced to the walls of the receptacle and the clean water gravitates toward the center. The water therefore, is cleanest at its point of entrance into the extension 21, from which it is conducted, freed of the scale, sludge and other impurities, to a point where it may be subsequently utilized as desired The blow-off steam which is delivered with the water and solid matter into the separator, rises automatically to the top, from whence it is discharged from the receptacle through a steam delivery pipe 22 which conducts the steam to the refilling tank or other preferred point of use.

It should be manifest from the foregoing that I have provided a separator which automatically and efficiently separates the steam, water, and solid matter and delivers these three constituents of the blow-off products by separate conduits from the separator; that the separator is simple in construction and devoid of screens, filters, and other apparatus which is liable to become clogged up and requires frequent dismantling of the separator for cleaning purposes; and that the separator is strong, simple and durable and is capable of indefinite use without repair and attention other than an occasional opening of the sludge valve to relieve the separator of the solid impurities. Various modifications in the details of construction shown and described may, of course, be resorted to without departing from the essence of the invention as defined in the following claim.

I claim:

A separator for blow-off steam and water, comprising a tank having its upright walls diverged downwardly, a steam outlet pipe leading from the top of the tank, a sludge off-take pipe leading from the bottom of the tank, a steam and water inlet pipe discharging tangentially into the tank adjacent the top thereof, and a clean water off-take pipe disposed above the middle of the tank and below the steam and water inlet pipe and having its open inlet end located substantially at the longitudinal axis of the tank.

FRANK W. MILLER.

Witness:
B. C. RINEHART.